United States Patent [19]
Parker

[11] Patent Number: 6,109,503
[45] Date of Patent: Aug. 29, 2000

[54] INTERNAL PIPE CLAMP

[75] Inventor: William David Parker, Tulsa, Okla.

[73] Assignee: Sabre International, Inc., Tulsa, Okla.

[21] Appl. No.: 09/079,923

[22] Filed: May 15, 1998

[51] Int. Cl.[7] ............................. B23K 37/02; B23K 31/02; B23K 5/22; B23K 9/12
[52] U.S. Cl. ........................... 228/44.5; 228/212; 219/61; 219/125.11
[58] Field of Search .............................. 219/125.11, 60 R, 219/61, 160, 161; 228/212, 44.5; 269/37, 43

[56] References Cited

U.S. PATENT DOCUMENTS

| | | | |
|---|---|---|---|
| 2,611,282 | 9/1952 | Bright | 74/518 |
| 2,830,551 | 4/1958 | Miller . | |
| 3,369,725 | 2/1968 | Thomas et al. | 228/49.3 |
| 3,369,779 | 2/1968 | Frederiksen et al. | 244/226 |
| 3,561,320 | 2/1971 | Nelson et al. | 29/493 |
| 3,644,977 | 2/1972 | Valentine | 29/200 P |
| 3,684,149 | 8/1972 | Ambler | 228/4 |
| 3,693,474 | 9/1972 | Trick | 74/522 |
| 3,697,720 | 10/1972 | Christopher | 219/8.5 |
| 3,920,171 | 11/1975 | Clavin | 228/44 |
| 3,937,382 | 2/1976 | Cunningham | 228/49 |
| 3,960,311 | 6/1976 | Griffiths | 228/49 |
| 4,042,231 | 8/1977 | Kopczynski et al. | 269/48.1 |
| 4,126,065 | 11/1978 | Clavin | 82/4 C |
| 4,140,262 | 2/1979 | Wilson et al. | 228/49 |
| 4,177,914 | 12/1979 | Clavin | 228/44 B |
| 4,285,458 | 8/1981 | Slavens | 228/49 |
| 4,306,134 | 12/1981 | Slavens et al. | 219/60 |
| 4,491,057 | 1/1985 | Ziegler | 91/503 |
| 4,708,279 | 11/1987 | Dearman | 228/49.3 |
| 4,852,418 | 8/1989 | Armstrong | 74/60 |
| 5,288,005 | 2/1994 | Beakley et al. | 228/49.3 |
| 5,293,810 | 3/1994 | Kimura et al. | 92/12.2 |
| 5,356,067 | 10/1994 | Leduc | 228/44.5 |
| 5,535,938 | 7/1996 | Leduc | 228/212 |

*Primary Examiner*—Patrick Ryan
*Assistant Examiner*—Zidia T. Pittman
*Attorney, Agent, or Firm*—Fellers, Snider, Blankenship, Bailey & Tippens, PC

[57] ABSTRACT

An internal spacer and expander clamp for use when welding two sections of pipe together. There are two spider rings supported from a frame, one in one section of pipe and the other across the joint in the other pipe. Each spider ring has a plurality of holes with a piston with a pipe contacting pad in each hole. A rotor is supported within said spider ring. A linkage bar is pivotally connected at one end to the piston and at the other end to a pin in a cut-out in the rotor. The convex ends of the linkage bar mates with a concave cut-out in the piston and the other end in a concave cut-out in the rotor. A power linkage rotates the rotor such that in a first position the longitudinal axis of the piston is out of alignment with the longitudinal axis of the linkage bar and in a second rotational position thus are aligned forcing the shoe against the inner surface of the pipe with great force.

6 Claims, 9 Drawing Sheets

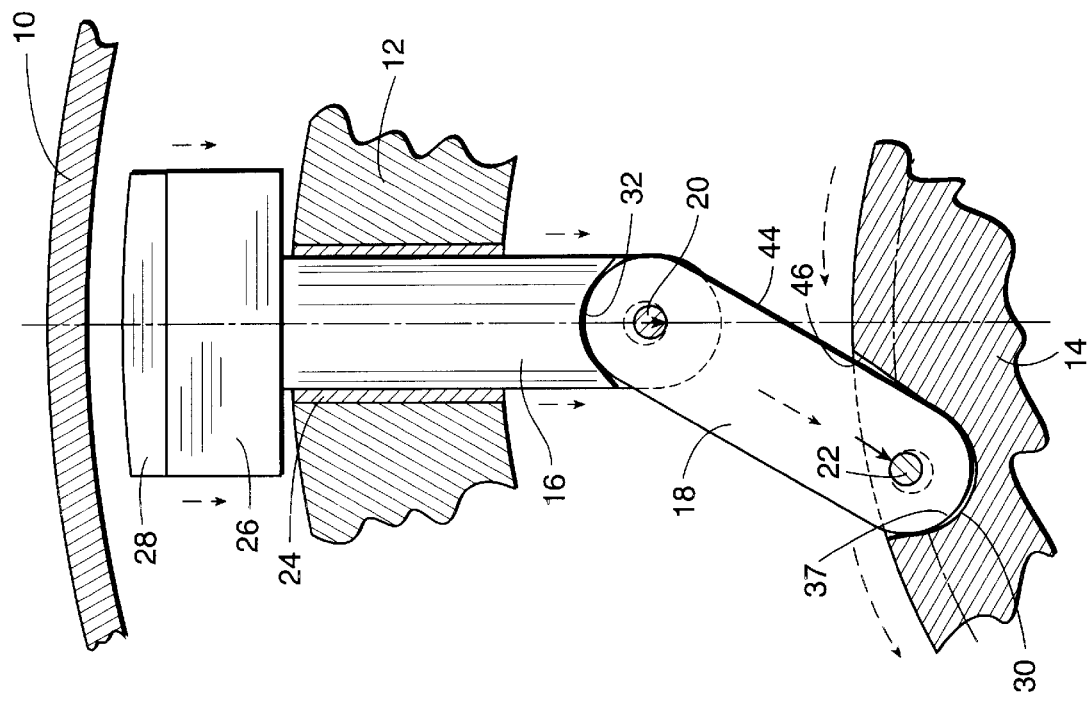
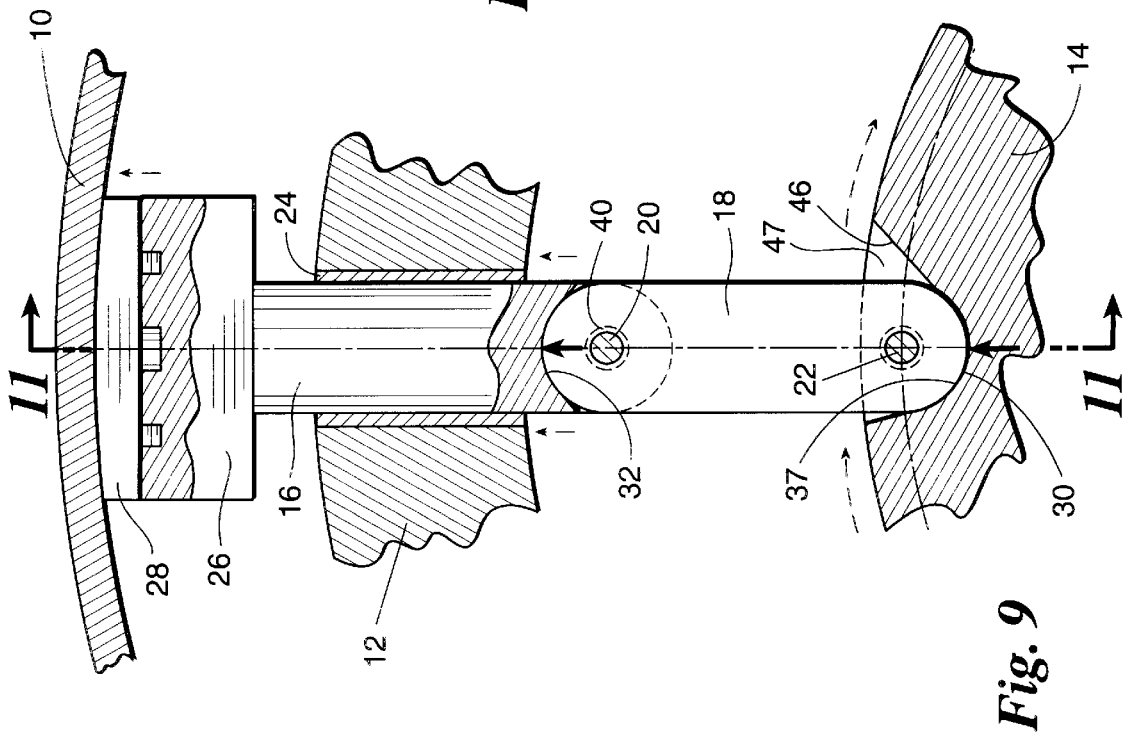
Fig. 10
Fig. 9

INTERNAL PIPE CLAMP

BACKGROUND OF THE INVENTION

This invention relates generally to internal pipe clamps.

Pipelines are laid extensively across the United States and other parts of the world in order to convey fluids or other material from one location to another. In the building of these pipelines numerous joints are laid end to end and welded together to form a conduit of the desired length and location.

The ends of adjacent pipe joints are welded together. The ends of these sections of pipe must be held during the welding operation. Internal welding clamps are generally used for this purpose. A frame supports a first spider ring and a second spider ring which are parallel to and spaced from each other. Each spider ring contains a plurality of radial pistons which when activated extend or retract radially through the spider ring. The outer end of these pistons contain a shoe or pad which contacts the inner surface of the pipe. One spider ring is in one section of pipe and the other in the other section, each near the ends of the pipe to be welded. By applying sufficient pressure to these pads on each spider ring the pipes are held substantially in fixed relationship with each other. Then welding operations may proceed. Pipe clamps are commercially available.

However, the presently available pipe clamps do not supply sufficient power or force to force the pipe into a round shape. The tensile strength of today's pipe is as high as X-70 and X-80 or more. The present clamping means cannot generate the force required to force out-of-round pipe into a "round" condition.

Some pipes are also "out-of-round." It is important to correct this. If one section of a pipe being welded is out-of-round in a different configuration than the other one then it is difficult to get a good weld. It is thus another object of this invention to provide clamps and supporting equipment which have sufficient power and force to force the pipe into a round or desired shape. This increases the welding efficiency.

SUMMARY OF THE INVENTION

This internal pipe clamp includes a frame supporting a first spider ring and a second spider ring. The planes of these spider rings are parallel to each other and the rings can be moved either closer or farther apart. Each spider ring contains a plurality of radial holes. A piston is in each hole for radial movement and each piston has an inner end and an outer end. The outer end of the piston is provided with a pad contoured to mate with the interior surface of the pipe when the piston is in its outermost or extended position.

A rotor plate having a smaller diameter than the inner diameter of the spider ring is supported within the spider ring.

There is a convex indentation in the inner end of each piston in the spider rings and also a mating concave one in the circumference of the rotor. Each concave indention in the rotor has a pin perpendicular to the rotor that extends through the concave section. Likewise, the concave section of the pistons each has a pin which is parallel to the pin in the rotor. A linkage bar has a hole in each end and extends from the pin in the piston to its corresponding pin in the concave indentation of the rotor. Ends of the linkage are convex to mate with the concave indentations in the piston and in the rotor. The indentations in the rotor is cut out so that the linkage has limited rotation about its pin supported by the rotor.

Rotating the rotor rotates the pins attached to the rotor, however, the pistons in the spider ring do not rotate. Thus the rotation of the rotor causes the pistons to be extended through the hole of the spider pin until the pads on the outer end of the pistons contact the inner wall of the pipe, i.e. until the longitudinal axis of the piston and of the linkage bar are aligned.

Power linkage is provided for rotating the rotor a sufficient amount to cause the pistons to be extended as just described. This includes a piston which may be hydraulic and has a piston rod. The housing of the cylinder is supported from the clamp frame. A yoke which may be a flat bar is fixed to the external end of the piston rod. A first toggle linkage which may also be a flat bar is pivotally connected at one end to a pivot which is supported by the spider ring and that end of first toggle is therefore stationary. The other end is connected to one end of the yoke. A second toggle linkage is pivotally connected at one end to a torque arm fixed to the rotor. The other end of the second toggle linkage is pivotally connected to the other end of the yoke. Extension of the piston with the yoke in a direction away from the piston, causes the first toggle linkage to rotate about the fixed pivot in the spider ring and the other toggle linkage rotates about the pivot in the torque arm. Inasmuch as the pin in the spider ring is fixed, the pin supported by the rotor is moved. By sufficient movement of the piston, the yoke and the two toggle linkage become aligned. This forces the torque arm on the rotor to move thus effecting the desired rotation of the rotor so that the pistons in the spider ring are extended until the pad contacts the inner wall of the pipe. This contact is effected by great force which is sufficient to force the pipe into "round" as desired.

This arrangement allows tremendous force to be exerted from the pistons onto the pads against the interior wall of the pipe.

Other objects and a better understanding of the invention may be had from the description which follows in relationship with the drawings in which:

BRIEF DESCRIPTION OF THE DRAWINGS

FIG. 9 is a view partly in section showing the alignment of the linkage and the piston so that the pad is forced against the inner wall of the pipe;

FIG. 10 is a view similar to FIG. 9 except that the rotor has rotated backwards and the pad is removed from the inner wall of the pipe;

DETAILED DESCRIPTION

Figure 1:
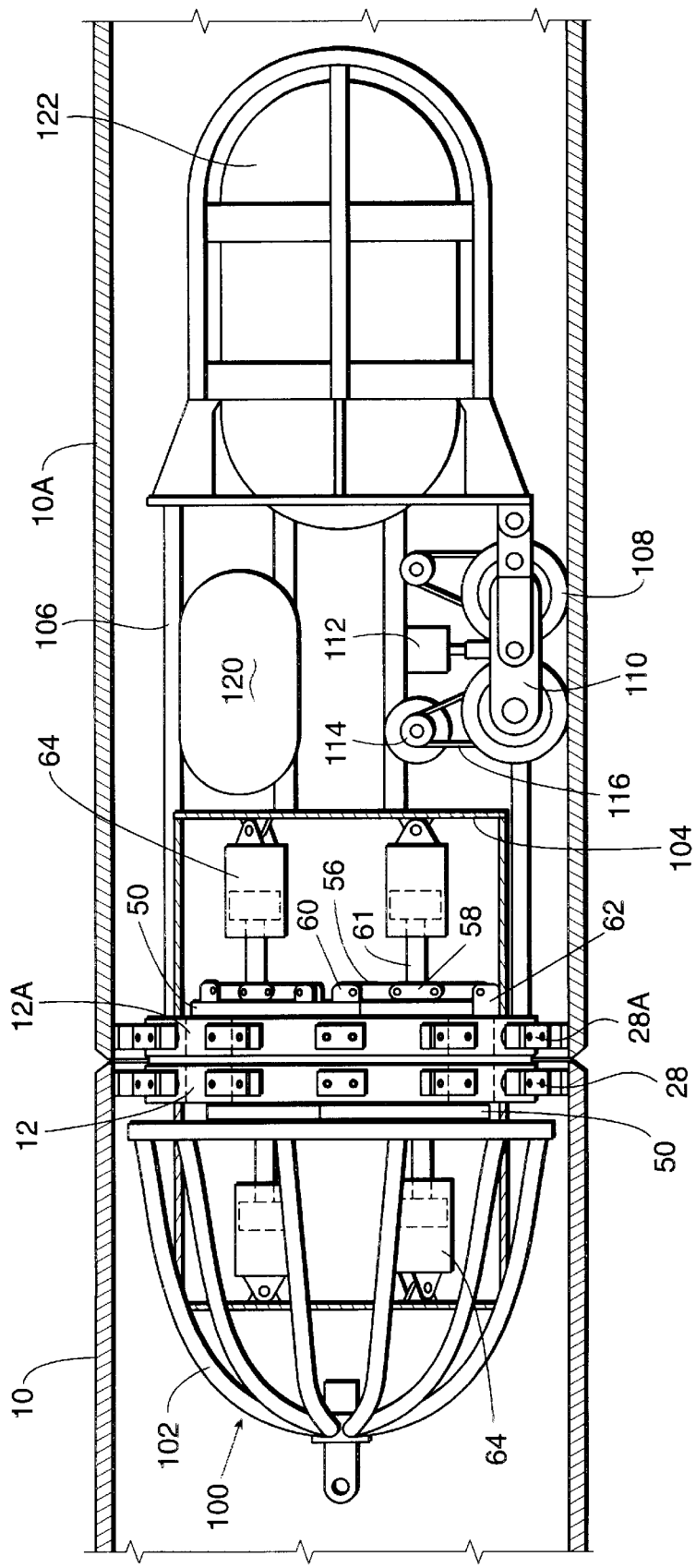
FIG. 1 is a side elevation view of the expander clamp of the present invention disposed in a pipe joint which has been cut-away and shown in cross-section to illustrate the overall clamp.

Attention is first directed to FIG. 1 which shows an overall view of the expander device or clamp of this invention. Shown thereon are two sections of pipe 10 and 10A which are to be welded together at the ends at the bevels as shown. There is a nose piece 100 with curved bars 102. There is in a main frame 106 which supports a sub-frame 104. The main frame 106 supports drive wheels 108 which is supported from bracket 110 which is attached to cylinder 112 for driving the wheel support bracket against the pipe. A drive sprocket 114 is provided with a drive chain 116 for driving the wheels 108. Any well known means for driving the drive sprocket 114 can be used. These drive wheels are used in a conventional manner for driving a frame inside the pipe until the device is at the desired location. Spider rings 112 and 112A are supported from sub-frame 104. These spider rings have shoes 28 and 28A which can be expanded against the inner surface of pipes 10 and 10A to expand the pipe as will be more fully discussed. Cylinders 64 are the power sources for this. Cylinders 64 are pivotally connected at one end to sub-frame 104 and the other end has a piston rod 61 which extends or retracts as will be explained later to extend and retract the piston supporting the shoes or pads 28 and 28A against the wall of the pipe. This includes piston rods 61, yoke 58, toggle linkage 56 and toggle linkage 54. This will all be discussed in greater detail, especially in regard to FIGS. 6 and 7. Expansion of these pistons force shoes 28 and 28A against pipe 10 and 10A to expand the pipe as needed to make it "round."

First air tank 120 and second air tank 122 are provided to supply air to the various air motors and pistons.

Figure 2:
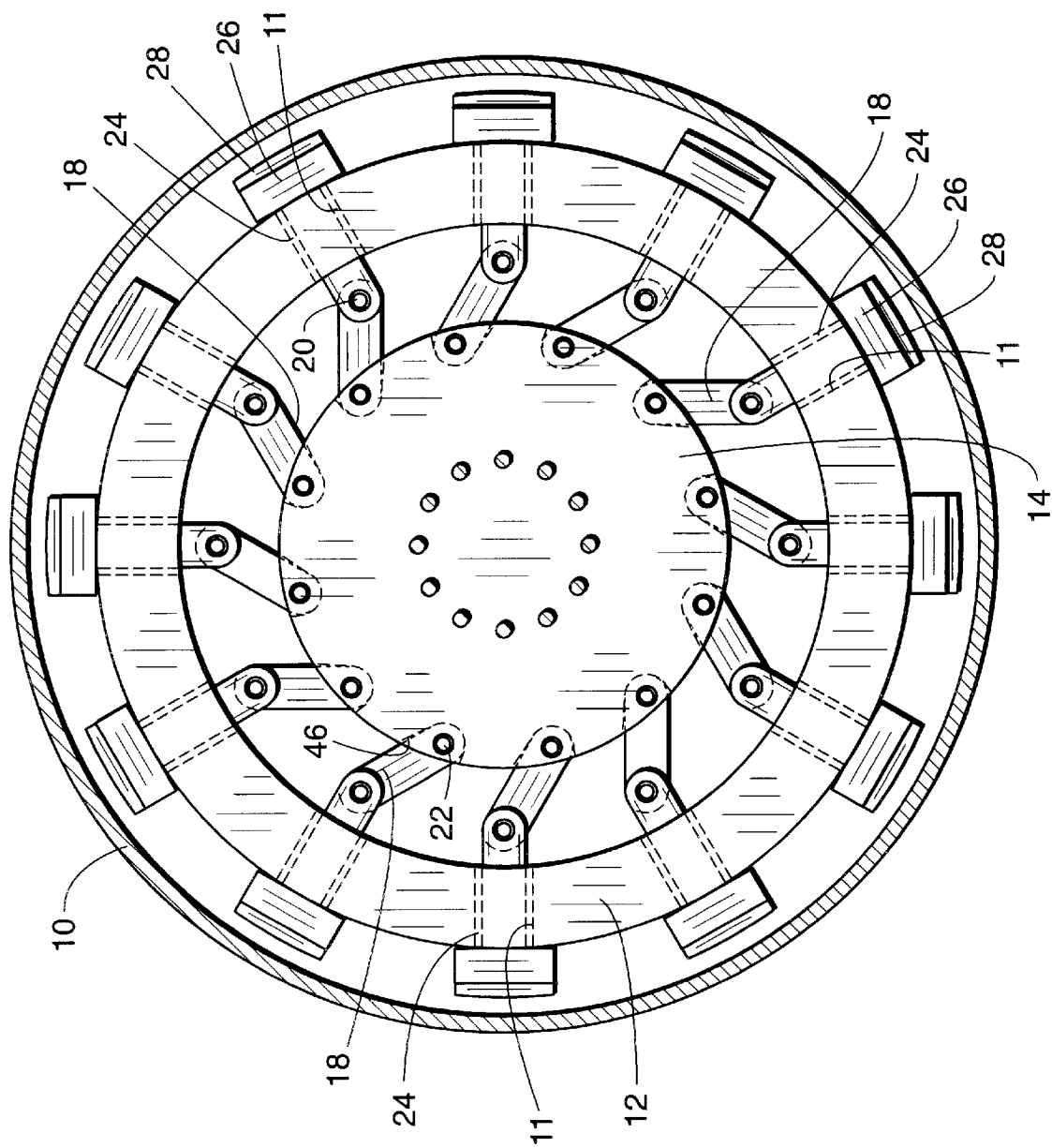
FIG. 2 illustrates a spider ring within a pipe, a rotor supported within the spider ring and the linkage connecting the rotor to the piston supported in the spider ring with the pistons in a retracted position.

Attention is now directed to FIG. 2 which shows the clamp in a "relaxed" position wherein the shoes or pads are not in contact with the pipe wall. In order to simplify this figure means for moving the shoes are not shown in this drawing: Shown are pipe 10, spider ring 12 which is attached to the clamp frame, rotor 14 which is supported within spider ring 12. There is a plurality of radial holes 11 in spider ring 12 through which piston 16 extends. For the purpose of illustration, a gap or space 24 is shown between pistons 16 and spider ring 12. In the preferred embodiment, gap 24 would allow just enough room for pistons 16 to reciprocate a slide within spider ring 12. Piston 16 can be a metallic cylinder constructed of steel which extends through the holes. The outer end of piston 16 supports a base shoe 26 and a curved shoe 28 which is attached to the base shoe such as by screws 29. The shoe 28 has a contour on its outer surface which mates with the inner surface of the pipe 10. The inner ends of pistons 16 are connected to the rotor 14. This connection includes a linkage bar 18 which is connected preferably by a hardened pin 20 to piston 16 and by second hardened pin 22 to rotor 14. This connection has concave and convex surfaces which will be discussed more completely in regard to FIGS. 8, 9 and 10. In FIG. 2 it is clearly seen that the linkage bar 18 and the piston 16 are not aligned. Therefore, the pads or curved shoes 28 are not in contact with the inner surface of pipe 10.

Figure 3:
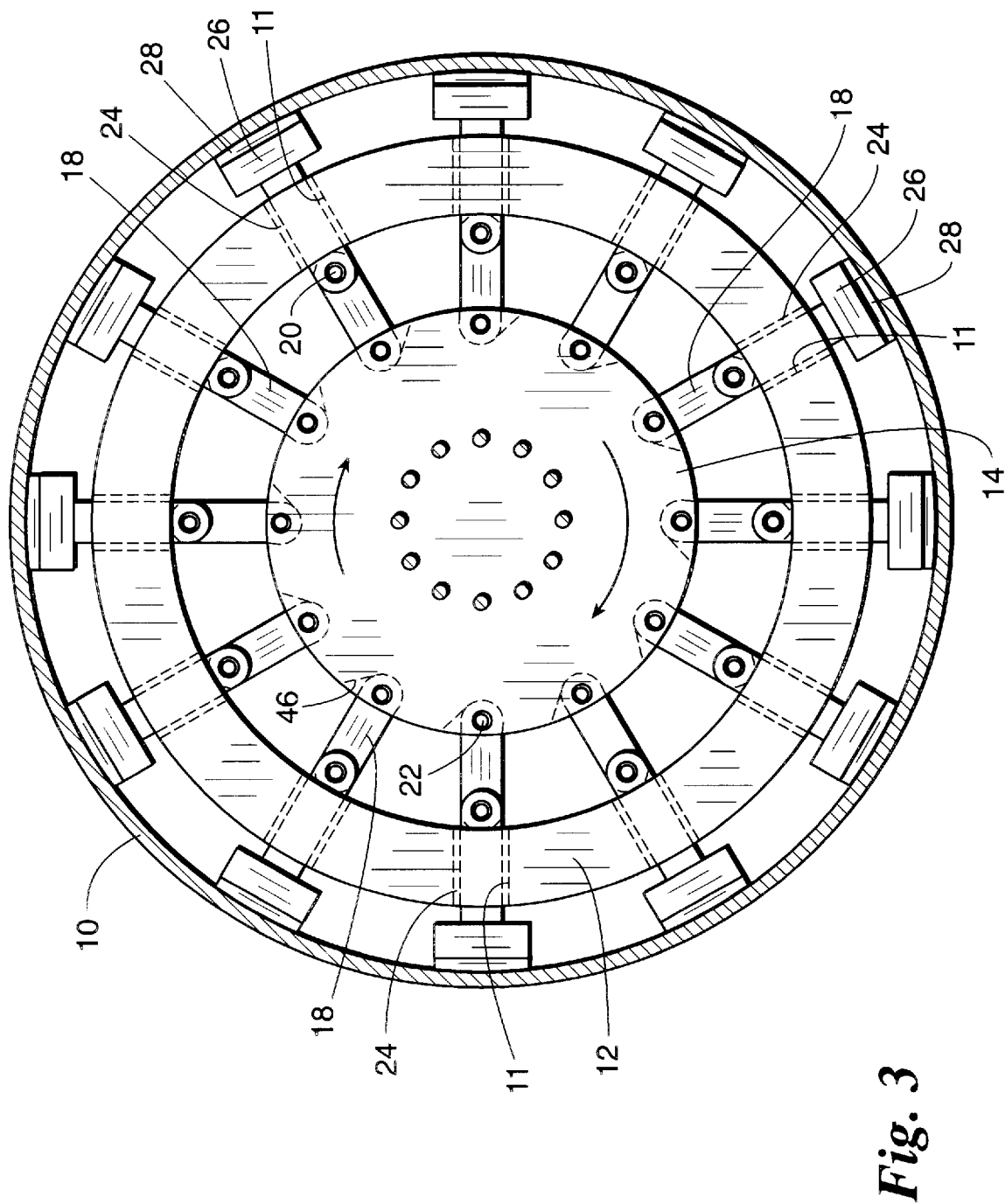
FIG. 3 is similar to FIG. 2 except that the rotor has been rotated to a point where the linkage is aligned with the pistons and the piston pads are in full forceful contact with the interior of the pipe.
Figure 4:
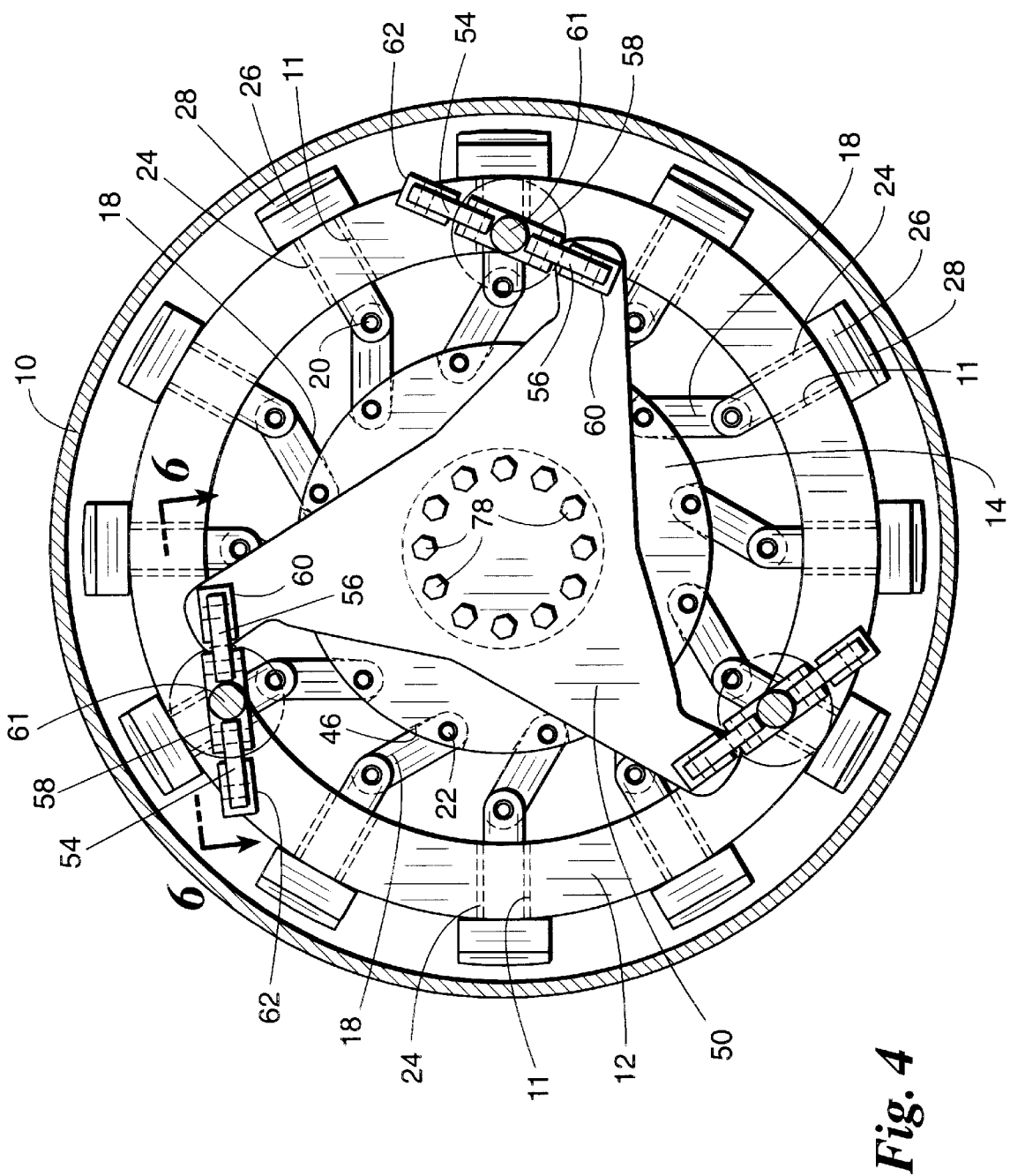
FIG. 4 shows a torque arm attached to the rotor shown in FIG. 2 and includes means for rotating the rotor.
Figure 5:
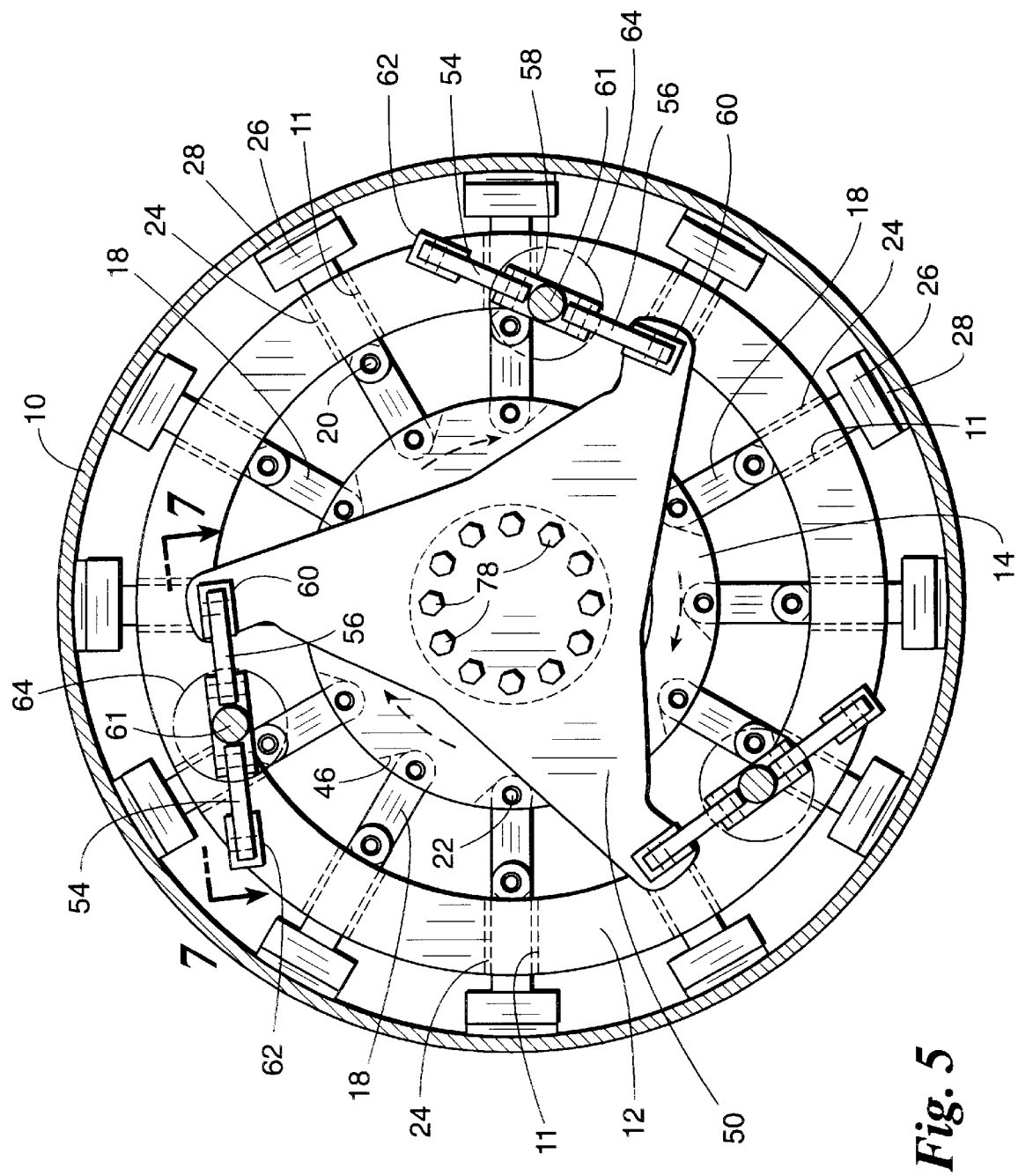
FIG. 5 is similar to FIG. 4 except that the rotating means have been actuated so that the pads are forcefully pushed against the interior of the walls such as illustrated in FIG. 3.

When it is desired to have the pads 28 contact the interior pipe surface one rotates the rotor 14 to the position shown in FIG. 3. In that position, the linkage bar 18 has a longitudinal axis which is aligned with the longitudinal axis of the piston 16. Thus great force is applied against the inner wall of the pipe 10.

Figure 8:
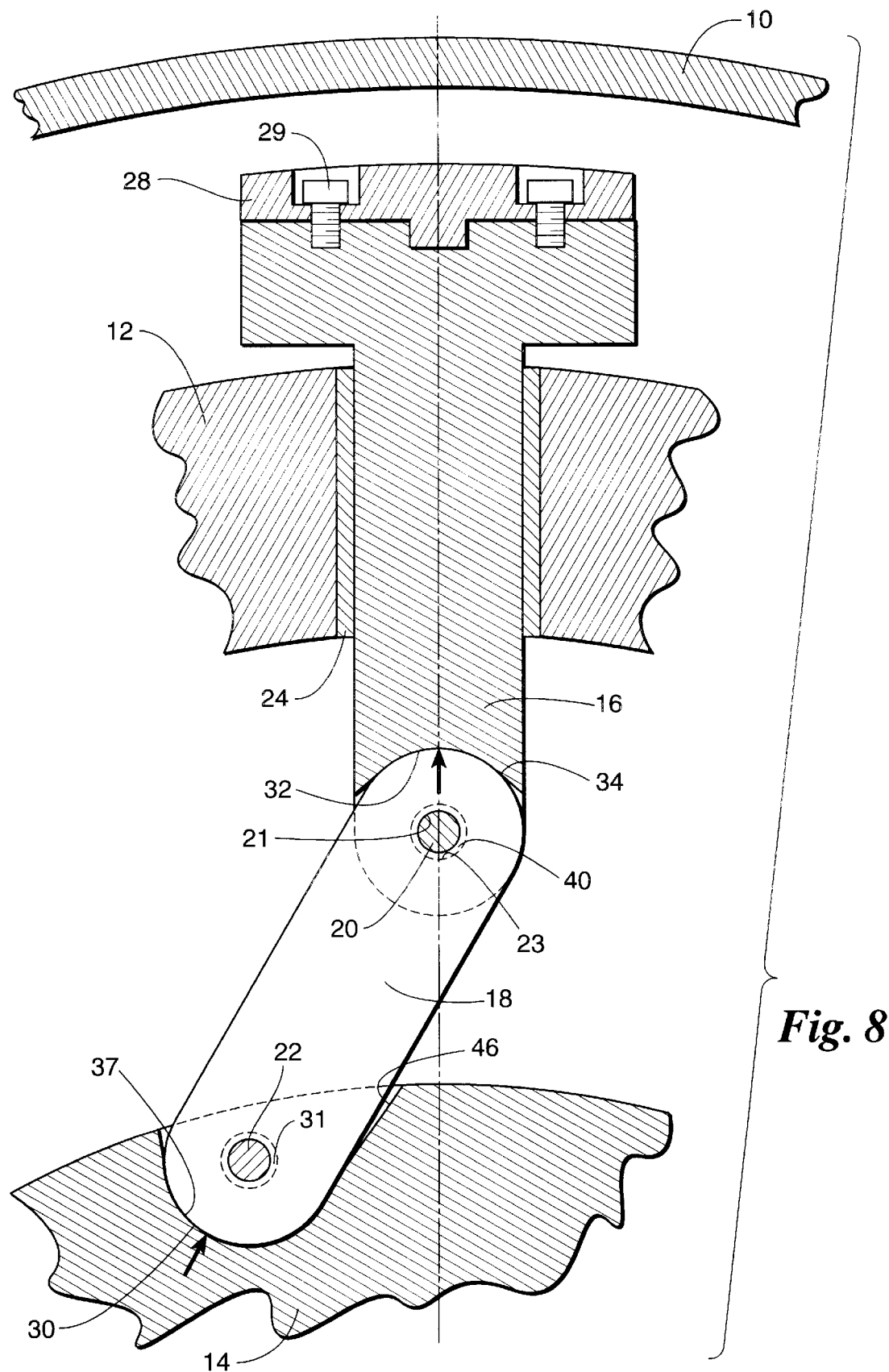
FIG. 8 is a view partly in section showing the linkage between the rotor and the piston and also illustrates the pad on the end of the spider ring piston.

Attention will now be directed especially to FIG. 8 to discuss the relationship of the configuration of one end of the linkage bar 18 and the indentation 30 in rotor 14 and the configuration of other end of linkage bar 18 in connection with its relationship to the concave indentation 32 in the lower end of the piston 16. The upper end of linkage bar 18 is convex as indicated at 34. This mates with the concave indentation 32 in the lower end of piston 16. Likewise, the lower end of linkage 18 is provided with a convex surface 30 which mates with the concave surface 37 of the cut-out of the rotor. The cut-out includes concave surface 37, enlarged surface 46 with space 47 (see FIG. 10).

Figure 11:
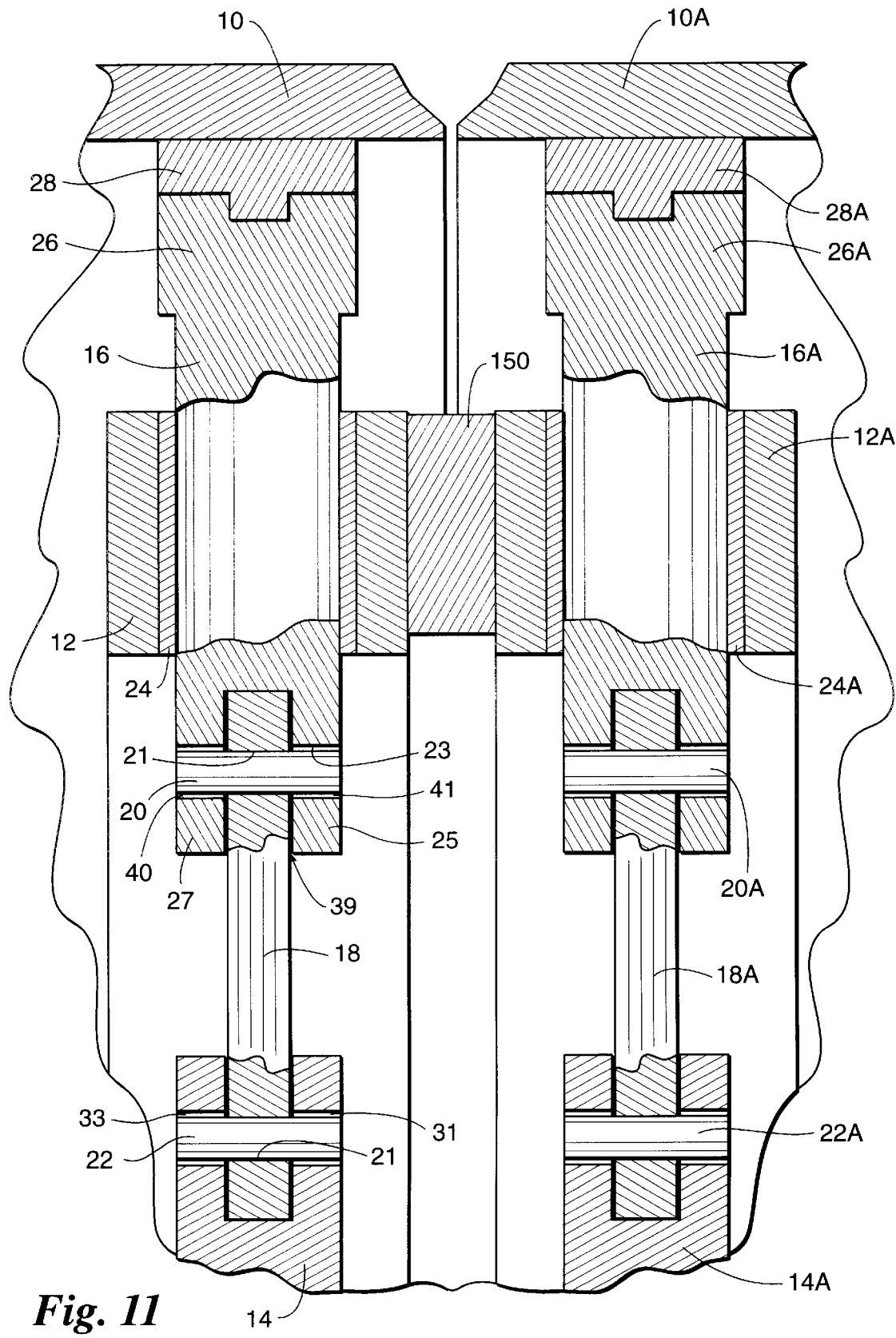
FIG. 11 is a view taken along the line 11—11 of FIG. 9.

There are two parallel spider rings 12 in the embodiment shown in FIG. 11. Pin 20 is press fitted into a hole 21 in the upper end of linkage bar 18 and lower pin 22 is press fitted in hole 21. The upper end of linkage bar 18 extends into opening 39 between tongues 27 and 25 of the lower end of piston 16. Pin 20 extends through holes 21 and 23 in tongues 27 and 25 of lower end of piston 16. There is a small clearance 40 and 41 between pin 20 and holes 21 and 23. Typically this clearance may be between about 0.003 and about 0.005 inches. A similar fitting is made for pin 22 which is press fitted into hole 21 at the lower end of linkage bar 18. Pin 22 has clearance 31 and 33 similar to clearance 40 and 41. This permits the force transmitted to pipe 10 will be through rotor 14 linkage bar 18, piston 16 and shoe or pad 28. Pins 20 and 21 do not have to carry the maximum load. There is a second spider ring 12A shown on the right side of the drawing and a pipe section 10A. The reference numerals are the same as on the left side except that the suffix "A" has been added. A spacer member 150 determines the spacing between spider rings 26 and 26A.

As rotor 14 is rotated from the position shown in FIG. 10 to FIG. 9, the longitudinal axis of linkage bar 18 will become aligned with the longitudinal axis of piston 16. As stated, the clearance of pins 20 and 22 in holes 40 and 23 permits a force to be transferred from rotor 14 through the linkage 18 and onto the lower end of piston 16. Pins 20 and 22 are not required to carry any of this force. This greatly increases the life of these pins.

When the rotor 14 is rotated counterclockwise, the force is released from the piston 16. When in the position shown in FIGS. 10 and 8, the linkage bar 18 will rotate about pin 22 until the edge 44 of linkage bar 18 goes into space 47 until it contacts surface 46. With this rotation of rotor 14, the pad 26 is completely removed from the contact with the interior of the pipe 10.

It is important that the contour of the concave indentation 32 of the piston 16 mates with the contour of the end 34 of the linkage 18 so that one may pivot with respect to the other. Likewise, it is important that the end 37 of the lower end of the linkage bar 18 can mate and pivot within the concave surface 30. A typical surface would approximate the partial surface of a cylinder. Application of general engineering technology one can design the various linkage, etc. to obtain means for exerting the desired force between pads 28 and pipe 10 using the concept disclosed herein.

Figure 6:
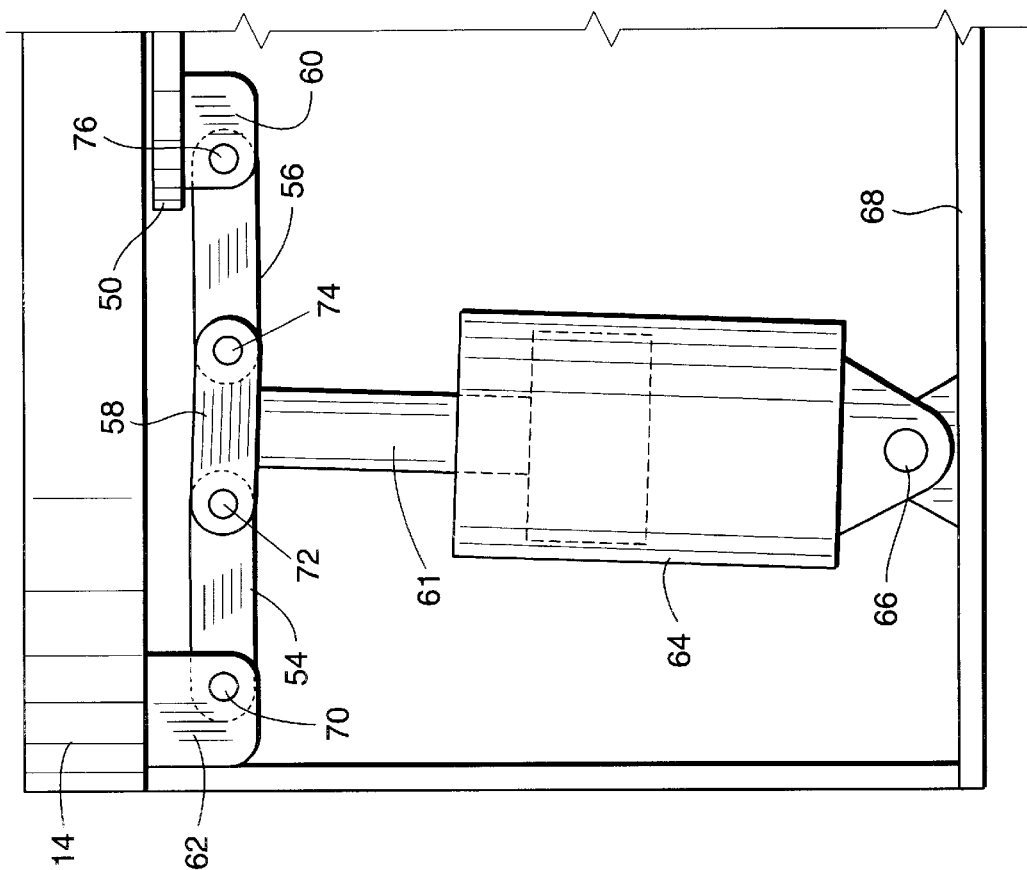
FIG. 6 is a view taken along the line 6—6 of FIG. 4.
Figure 7:
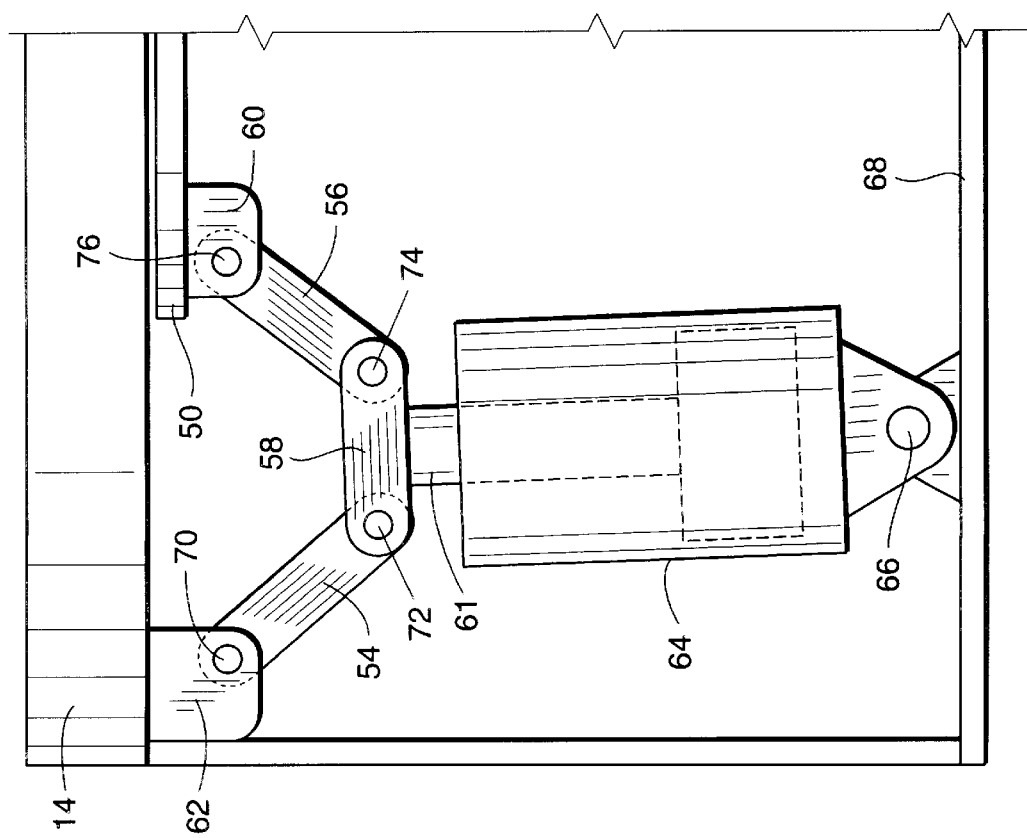
FIG. 7 is a view taken along the line 7—7 of FIG. 5.

Attention will next be directed at the power linkage for rotating rotor 14. Attention is directed to FIGS. 4, 5, 6 and 7. A torque arm 50 having three corners is bolted by bolts 78 to the rotor 14. Any reasonable number of corners of the arm can be used. A piston cylinder 64 is supported by pivot 66 from frame 68 as shown in FIGS. 1 and 6. A support structure 62 is rigidly attached to the spider ring 14.

Likewise, a support structure 60 is secured to torque arm 50. The outer end of piston rod 61 is attached to a yoke 58. A first toggle linkage 54 connects between pivot 72 on yoke 58 and pivot 70 on structure 62. A second toggle linkage 56 connects between pivot 74 on yoke 58 an pivot 76 and support structure 60. These pivots may be pins.

Likewise, toggle linkage 56 is connected by pivot pin 72 to toggle linkage 54 and by pivot pin 74 to yoke 58.

When the piston rod 61 is in the position shown in FIG. 6, the pistons 16 are in the retracted position shown in FIG. 2. When in this position the device of FIG. 1 is rolled into position inside pipe 10 until it assumes the desired position such as shown in FIG. 2. When it is desired to force the pistons to an extended position whereby the pads 28 with great force contact the interior of pipe 10, cylinder 64 is activated so that the piston rod 61 forces the yoke 58 into the position shown in FIG. 7. Inasmuch as pivot pin 70 is fixed to the spider ring 14 which does not move the force exerted causes movement of the torque arm 50. This in turn rotates the rotor 14 until linkage 18 is aligned with piston 16. This is the position shown especially in FIGS. 3 and 5. Great force is thus applied to the interior of the pipe forcing it into "round" if it were in fact out of round.

When it is desired to retract piston 16 and shoe 28 from contacting the interior surface of pipe 10, one retracts the piston rod 61 to the position shown in FIG. 6. This places the pads, etc. in the position shown in FIGS. 2, 4 and 10. Space 47 is important as it provides room for linkage bar 18 as it rotates about pin 22 when the rotor is rotated counterclockwise as shown in FIG. 10.

The size of cylinders 64, pressure of fluid applied, and the length of various linkage provided determines the travel of arm 50 and the force applied through pads 28 to pipe 10.

While it is most difficult to calculate the forces which can be exerted using this concept of this invention it has been estimated by using such concepts that total force of over 470,000 pounds can be exerted on the interior of a forty-two inch pipe, for example. It is considered that this will straighten most pipe into the roundness required.

Thus, it is apparent that there has been provided, in accordance with the invention, an internal pipe clamp that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. Internal expander clamp for use with welding two joints of pipe together which comprises:

a frame;

a spider ring supported from said frame and having a plurality of radial holes;

a piston in each hole in said spider ring for radial movement, each piston having an inner end and an outer end;

a pad on the outer end of each said piston adapted to contact the inside of the pipe;

a rotor supported within said spider ring and having pivot pins;

said rotor being capable of rotation with respect to said spider ring;

a linkage bar having a first end and a second end, the first end pivotally connected to the inner end of said piston and a second end pivotally attached to a pin supported by said rotor;

power linkage for rotating said rotor sufficient to move said linkage bar into and out of alignment with said piston.

2. The internal expander clamp as defined in claim 1 in which said power linkage for rotating includes:

a torque arm fixed to said rotor;

a first pivot pin supported from said spider ring and a second pivot pin supported from said torque arm;

a power piston housing having a piston rod and supported at one end from said frame;

said piston rod having an inner end and an outer end;

a yoke fixed to the outer end of said piston rod;

a first toggle linkage and a second toggle linkage, said first toggle linkage pivotally connected at one end to said first pin supported from said spider ring and to a second pivot on said yoke, said second toggle linkage pivotally connected at one end to said torque arm and at an other end pivotally connected to one end of said yoke.

3. A pipe expander as defined in claim 2 in which:

the inner end of said piston has a concave section;

said rotor having a cut-out section including a concave section;

said linkage bar having at its outer end a convex section to mate with the concave section of said piston and the second end of said linkage having a convex section to mate with a concave section of said rotor;

the cut-out in said rotor has an enlarged portion to permit the linkage to have limited rotation about the pin in said rotor.

4. A pipe expander as defined in claim 1 in which:

the inner end of said piston has two tongues with a concave section therebetween to receive the first end of said linkage bar, a first hole in said linkage bar aligned with second holes in said tongue, and including a pin extending through said first and second holes, the diameter of said first hole being the same as that of the pin and the diameter of the second hole being longer than that of said pin to provide a clearance, and in which the rotor includes a cut-out having two tongues with a concave space therebetween to receive the second end of said linkage bar, a third hole in said second end of said linkage bar and a fourth hole in one of said rotor tongues, and a fifth hole in the other tongue, all third, fourth and fifth holes are aligned said pin of said rotor extending through said holes, the diameter of said pin being the same as that of the third hole and less than that of the fourth and fifth holes.

5. An apparatus for use in welding two sections of pipe together which comprises:

a spider ring having a radial hole and a piston extending therethrough, said piston having an inner end and an outer end, the inner end having a concave section;

a rotor having a cut-out including a concave section;

a linkage having an outer end and an inner end, said outer end having a convex section to mate and engage with the concave section of said piston and the inner end having a convex section to mate and engage with the concave section of said rotor;

the cut-out in said rotor has an enlarged portion from said concave section to permit the linkage to have limited rotation within said concave section of said rotor;

power linkage to rotate said rotor.

6. An apparatus as defined in claim 5 in which said power linkage includes:

a torque arm fixed to said rotor;

a first pivot pin supported from said spider ring and a second pivot pin supported from said torque arm;

a power piston housing having a piston rod;

said piston rod having an inner end and an outer end;

a yoke fixed to the outer end of said piston rod;

a first toggle linkage and a second toggle linkage, said first toggle linkage pivotally connected at one end to said first pin supported from said spider ring and to a second pivot on said yoke, said second toggle linkage pivotally connected at one end to said torque arm and at an other end pivotally connected to one end of said yoke.

* * * * *